United States Patent [19]
Petigrew et al.

[11] Patent Number: 5,206,490
[45] Date of Patent: Apr. 27, 1993

[54] BAR CODE PRINTING

[75] Inventors: Robert M. Petigrew, Foxton; Alan J. Harry, Royston; Paul R. Nailor, London, all of United Kingdom; Fred Adelmann, Eberbach am Neckar, Fed. Rep. of Germany; Peter Franzen, Hirschhorn am Neckar, Fed. Rep. of Germany; Juergen Schoon, Eberbach am Neckar, Fed. Rep. of Germany; Vincent Geake, Cambridge, United Kingdom

[73] Assignee: Esselte Meto International Produktions GmbH, Neckar, Fed. Rep. of Germany

[21] Appl. No.: 646,885

[22] Filed: Jan. 28, 1991

Related U.S. Application Data

[63] Continuation-in-part of Ser. No. 392,432, Aug. 11, 1989, abandoned.

[30] Foreign Application Priority Data

Aug. 12, 1988 [GB] United Kingdom ............... 8819172

[51] Int. Cl.$^5$ ............................................. G06K 7/10
[52] U.S. Cl. ................................. 235/462; 235/454; 235/455; 235/468; 235/491; 235/487
[58] Field of Search .................. 283/81, 88; 235/462, 235/468, 491, 494, 454, 455, 487

[56] References Cited

U.S. PATENT DOCUMENTS 4,889,367 12/1989 Miller ................................. 235/468

Primary Examiner—Harold Pitts
Attorney, Agent, or Firm—Poms, Smith, Lande & Rose

[57] ABSTRACT

A method of bar code printing is disclosed. The bar code is printed directly onto packaging material associated with the product, and in that the ink used to produce the bar code is such that indicia constituting the bar code can be discriminated regardless of the background onto which the bar code is printed.

22 Claims, 2 Drawing Sheets

BAR CODE PRINTING

CROSS REFERENCE TO EARLIER APPLICATION

This is a continuation-in-part of application Ser. No. 07/392,432 filed on Aug. 11, 1989, now abandoned on behalf of the same inventors.

This invention relates to bar code printing.

BACKGROUND OF THE INVENTION

Bar codes are now widely used for ready identification of products at goods-in and check-out locations associated, for example, with retail trading. They facilitate the use of fully automatic in-and-out systems and, in some instances, do away with the need for price labels on the products. Many supermarkets stock 25,000 to 30,000 items for sale, however, and do not have sufficient shelf space to allocate all of these items to a particular position; as a result, even if there is a bar code on such products, there is still a need for price marking. Nevertheless, the use of bar code scanning system to identify the goods may reduce labour requirements significantly and thus produce considerable savings.

In supermarkets, typically 95-96% of food items going through the check-out have a bar code already printed at source by the manufacturer. For non-food items, the number of products bar coded at source is typically 80-85% of those going through the check-out.

In order to apply price labels to items already carrying a bar code, and to add a bar code to those products which are not coded at source, it is common for a retail outlet to use one or more label printers. These may be hand-held or fixed in position. Typically, three stationary printers may be used by up to ten people. Strips of labels will be printed and taken to the product and either applied by hand or with a dispenser. Some retailers consider that it is more economical for each operative to have his own hand-held bar code label printer.

If a national bar code has been allocated to a given product, this will normally be used by the retailer if no manufacturer's bar code is present. For products where no such national bar code has been allocated, it is up to the retailer to decide on his own bar code number. Typically, this number might be based on the numbering system used by the retailer before the introduction of bar code scanning to his store. In practice, the person generating bar codes with a printer will have with him source material which indicates the nature of the bar code for each product where a label is required.

Hand-held labelling machines typically comprise a housing which is arranged to store a label supply roll; a printing unit; and a keyboard for inputting data. When such a machine is used to print bar code labels, an operative will input the bar code number via the keyboard, which then activates a label feed mechanism and the printing unit to apply the requested bar code to one of the labels on the supply roll. After the bar code has been printed, the label feed mechanism moves the supply roll so that the printing label is accessible for application to the appropriate goods item.

Packaging materials vary widely in the nature of the material from which they are fabricated, in background colour and in finish. Current bar codes are in the form of black indicia on a white background. These factors encourage the use of labels which provide a background which is uniform in quality and colour.

While the use of labels as a vehicle to carry bar codes is, in many instances, convenient and effective, nevertheless there are certain situations in which this standard technique causes problems. For example, many items are packaged in small units with substantially all of their exterior surface carrying graphic displays and consumer information. In such cases, the application of a label may obscure data which is intended to be displayed. Printing a bar code onto a label necessitates transfer of the label to the goods; when dealing with a large volume of products, the label transfer step makes a significant contribution to the overall time involved in the labelling exercise and consequently contributes to the overall cost involved in generating and applying bar code labels.

SUMMARY OF THE INVENTION

We have perceived that there is a need for a system which permits bar codes to be printed directly onto product packaging without using an adhesive label as an intermediate support. Accordingly, the present invention provides a method of applying a bar code to a product, characterised in that the bar code is printed directly onto packaging material associated with the product, and in that the ink used to produce the bar code is such that indicia constituting the bar code can be discriminated regardless of the background onto which the bar code is printed.

In one embodiment, a matt ink is used to generate bar code indicia, and the bar code is printed directly onto a glossy area of packaging material. In this way, the mat ink provides a machine-detectable reflective contrast between indicia of the bar code regardless of any change in ground colour of the packaging. A variant of this embodiment is to use a gloss ink on a matt multi-coloured area of packaging material.

In another embodiment, the ink used to generate bar code indicia possesses chromaticity at the extremes of the visible spectrum or on the infra-red or ultra-violet regions of the spectrum. In this embodiment. the "colour" of the ink is either invisible to the human eye or (by virtue of its being at the extremes of the visible spectrum) is barely distinguishable over the background colour of the packaging material.

To facilitate generation of direct bar codes in the embodiments discussed above, a bar code printer may be used which is capable of measuring the mean albedo of an area of packaging material and to select a suitable ink (whether possessing chromaticity in the visible range or only beyond the visible range, e.g. in the ultra violet region). Such a selected ink might be, for example, a matt black or gloss black ink or an infra-red ink according to this measurement.

In a third embodiment of the invention, a bar code application unit is used which is capable of printing two distinct colours—for example—black and white—so that the colour of the packaging material onto which the bar code is directly printed does not affect readability of the bar code. This may be useful where the packaging material is transparent.

In all of the embodiments described above, direct bar code printing is beneficial since the location of the bar code in relation to the packaging material does not need to be carefully selected. Furthermore, when an ink having chromaticity in the UV or IR part of the spectrum (but none in the visible part) is used, the bar code can be placed in any location, or even all over the packaging material, since it is not visible to the human eye and so does not interfere with information carried by the packaging. In addition, where a large area of the packaging material carries a bar code with UV or IR chromaticity only (and is thus 'invisible' to the human eye), a check-out operator's job is facilitated since any pass of a light pen (with a beam at an appropriate wavelength) will detect the bar code, regardless of where on the packaging material the light pen is applied.

BRIEF DESCRIPTION OF THE DRAWINGS

For a better understanding of the invention, and to show how the same may be carried into effect, reference will now be made, by way of example, to the accompanying drawings, in which.

DESCRIPTION OF THE PREFERRED EMBODIMENT

Figure 1:
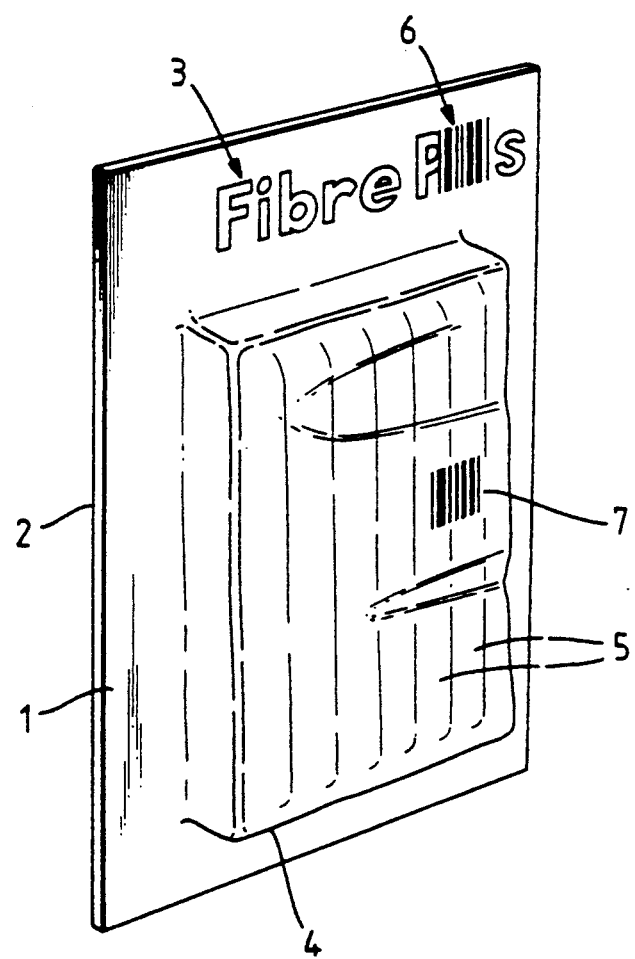
FIG. 1 illustrates the application of bar codes to a pack of fibre pens.

Referring to FIG. 1 of the drawings, a pack 1 comprises a backing material 2 carrying identification printing 3 and covered with a bubble pack 4 within which fibre pens 5 are retained. For purposes of illustration, the location of two bar codes 6 and 7 is shown in the drawing. Bar code 6 is positioned over the printing 3, and is machine-readable despite the varying contrast and/or colours of the background. Bar code 7 is printed directly onto the transparent surface of bubble pack 4, and again can be read by machine regardless of the nature of the surface onto which it is applied and regardless of any colours and/or contrast edges behind the transparent surface. Although for ease of depiction the bar codes 6 and 7 are shown as optically dense regions, it will be appreciated that the visual impact of the bar codes may be minimal. For example, bar code 6 could be generated using infra-red-absorptive ink which would not obscure the printing over which it was applied. To enable a sales assistant to determine the location of such an 'invisible' bar code, a prearranged location may be agreed as a standard location for the product in question, or the bar code may be accompanied by a location symbol, for example a white dot. Alternatively, the entire packaging may carry a plurality of such invisible bar codes.

The bar code 7 may be formed by use of black and white inks to generate the bar code indicia. With a location such as that indicated for bar code 7, obliteration of material behind the bar code is not of particular importance.

Figure 2:
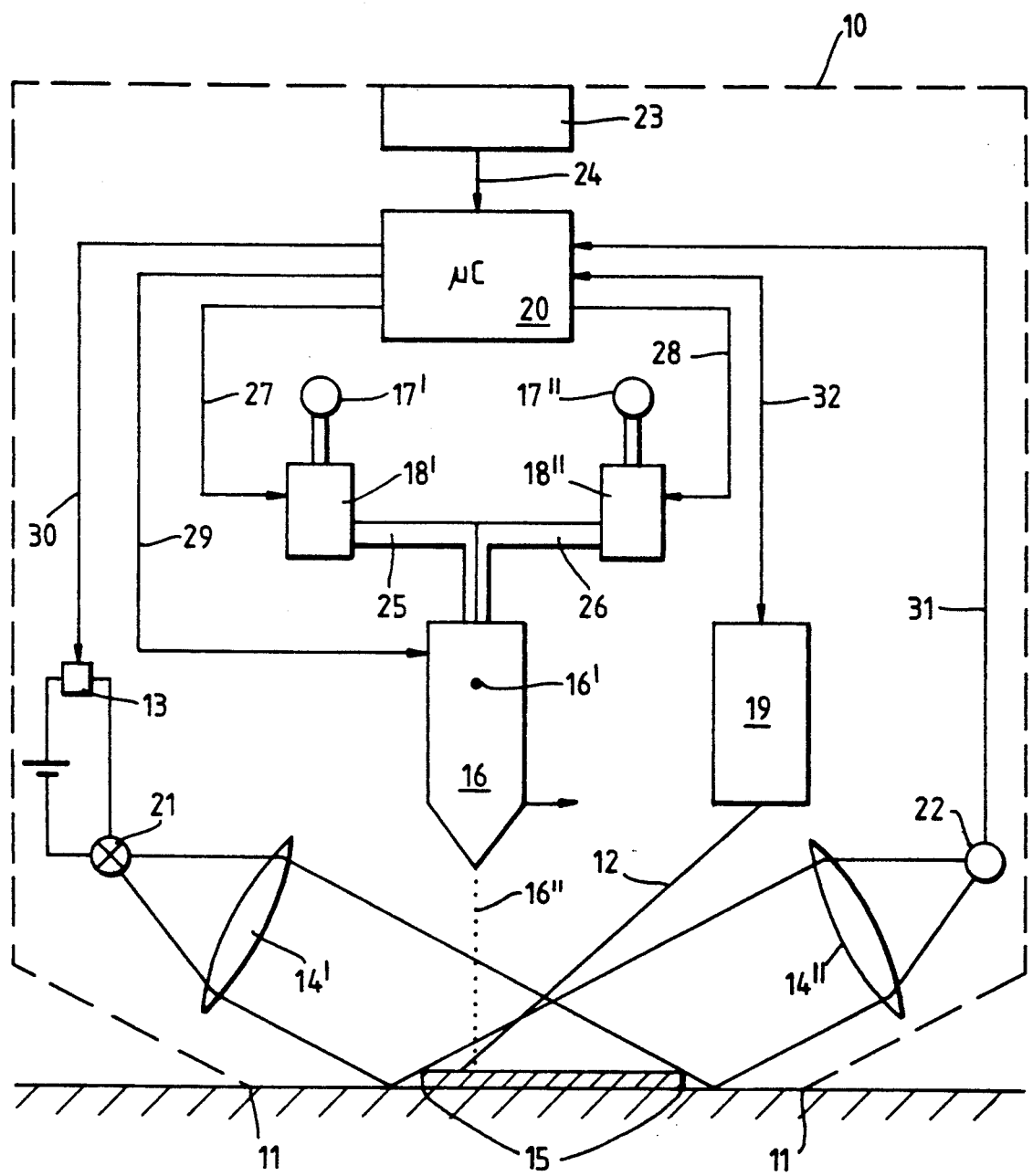
FIG. 2 shows a diagrammatic representation of a bar code printer in accordance with one embodiment of this invention.

Referring now to FIG. 2 of the drawings, a diagrammatic illustration of a bar code printer 10 in accordance with this invention is shown. The components of the bar code printer are delineated by dashed lines. Printer 10 is intended to be brought into contact with an area 15 which is to be imprinted with a bar code. The printer itself has a window 11 which is of greater extent than the area 15.

Printer 10 includes a microprocessor or microcomputer 20 and data input means 23 (e.g. a keyboard) which permits entry of data into microcomputer 20 via line 24. An array-type ink jet print head 16 is provided for generating the bar code at area 15. Print head 16 may be a conventional array ink jet print head, for example such as described in DE-3234394C or DE-3319001A or U.S. Pat. No. 4,695,854. The print head is mounted so as to be pivotable about axis 16' which is normal to the plane of the drawing. In operation, a plurality of ink droplets 16" are ejected from print head 16 and generate the desired bar code at area 15.

Printer 10 contains two ink reservoirs 17' and 17"; these are intended to contain inks of different chromaticity (whether in the visible range or in the infra-red or ultra-violet regions of the electromagnetic spectrum-)and/or albedo . Reservoir 17" is connected to an ink pump 18' and similarly reservoir 17" is connected to an ink pump 18". Ink is delivered from pump 18' to print head 16 via conduit 25; and ink is delivered by pump 18" via conduit 26. The two ink pumps are under microcomputer control via lines 27 and 28, respectively. Similarly, the operation of print head 16 is controlled by microcomputer 20, function commands being delivered to print head 16 via line 29.

Printer 10 also incorporates a number of less conventional components. These include a light source 21; a photodetector 22; a bar code scanner 19; and imaging lenses 14' and 14". The function and interrelationship of these components will be apparent from the following description of one embodiment of a printing method in accordance with this invention in which the printer 10 is employed.

In order to permit direct printing of bar code indicia on to the packaging material in which an article for sale is enclosed, it is desirable to employ a printing arrangement which will not interfere with any visual display material on the packaging. This can be achieved, for example, by using an ink which is strongly absorbent in the infra-red region, but not in the visible region of the spectrum; or by using an ink which is strongly absorbent in the ultra-violet region, but not in the visible region, of the spectrum. Since bar codes printed in such inks are invisible to the human eye, their location on the packaging material is of no significance, so far as the customer is concerned. In order to assist a check-out operator in his or her duties, a plurality of 'invisible' bar codes may be located substantially over the entire area of the packaging material so that a pass of a light pen over any region of the packaging material will detect a bar code with complete confidence.

At the start of a printing operation, the mean albedo of the area 15 is first measured. Light source 21 is switched on by an electronic switching circuit 13 under control of the microcomputer 20 via line 30. Converging lens 14' directs the illumination from light source 21 onto the area 15. Light reflected from the area 15 passes to a second converging lens 14" which focuses the reflected light onto photodetector 22. The output of photodetector 22 is conveyed to microprocessor 20 via line 31. Microcomputer 20 also contains an information store containing chromaticity and albedo details of the two inks which are stored in reservoirs 17' and 17", respectively. Generally speaking, one or both of the albedo and the chromaticity of the two inks will differ significantly, so that (for example) at a given wavelength one ink will have a high albedo while the other ink will have a low albedo. Light source 21 is preferably of a type which can operate at a plurality of pre-selected wavelengths; for this purpose, the light source may comprise a broad band illuminating source together with a plurality of selectable filters; or it may comprise a tunable laser; or it may comprise two or more lasers having outputs in relatively distant parts of the electromagnetic spectrum, for example a frequency doubled or frequency tripled YAG laser (at the blue end) and a carbon dioxide laser (at the red end). Microcomputer 20 controls the operation of light source 21 and in accordance with the output of photodetector 22 selects between one of the two ink sources 17' and 17". If, for example, the area 15 of the packaging material is found to have a very high albedo (reflectance) to light in the infra-red region, then an ink having high infra-red absorption properties (but with substantially no absorption in the visible region of the spectrum) may be selected—say, for convenience, from ink reservoir 17'.

After the ink source has been selected, the microcomputer 20 activates ink pump 18' and print head 16 to deliver the ink droplets 16 in the desired bar code pattern through opening 11 onto area 15 of the packaging material. The array of nozzles of print head 16 are aligned in a plane perpendicular to the plane in which FIG. 2 is drawn. By this arrangement, the whole of area 15 can be printed with a bar code.

Once the bar code indicia have been printed, bar code scanner 19 is used to generate a movable laser beam 12 under control of the microcomputer 20 via line 32. Preferably, the optical properties of laser 12 and of light source 21 are similar, although it is not essential for them to be identical. Bar code scanner 19 thus reads the imprinted bar code through laser 12, and the output of the scanner 19 is directed to microcomputer 20 via the two-way line 32. The microcomputer then compares the measured output from bar code scanner 19 with values stored in a memory in order to determine whether the printing operation has been successful. If the measured bar code does not correspond with the bar code stored in the microcomputer memory, this indicates that the imprinted image is inaccurate, and further process steps are required. Firstly, the inaccurate bar code must be eliminated from the packaging material and, in order to achieve this result, the print head 16 is used to cover the whole of area 15 with ink from reservoir 17'. Once this ink deposition stage is complete and the ink has dried over area 15, a successful bar code can be generated in that area by a further printing operation using the other ink i.e. that from reservoir 17". Thus the printing operation as described above in relation to use of ink from reservoir 17' is repeated using instead ink from reservoir 17". Bar code scanner 19 is then used once again to check the resultant bar code. Where the bar code indicia need to be printed for a second time in the way just described, ink from reservoir 17" may be used in the negative mode—that is, those areas which in the first printing operation were free from ink 17' are now printed with ink from 17" and vice versa. By this means, an acceptable bar code image is obtained despite the failure of the first printing operation.

In another embodiment, both inks may be deliberately used in order to generate a bar code. Thus one of the inks may first of all be used to generate a background chromaticity over the whole of area 15, and thereafter the other of the two inks used to generate the bar code indicia on the pre-printed background. This embodiment may be of use in circumstances where the printed packaging material is to be scanned by a relatively simple scanner which can only scan bar codes consisting of bars in one colour on a background of another colour, e.g. black bars on a white background. It is preferred, however, to use just a single ink which is advantageously of substantially zero chromaticity in the visible region, but with high absorption in either the infra-red or ultra-violet regions.

If the conduits 25 and 26 which supply ink to print head 16 are arranged so that the ink jet array has 50% of its drives dedicated to one ink and the other 50% of its drives dedicated to the other ink, it is possible to print a two-colour bar code in a single printing operation.

We claim:

1. A method of applying a bar code to a product, including the steps of measuring a mean albedo of a packaging material associated with the product, selecting a first ink from a set of inks having different albedos and imprinting bar code indicia with said first selected ink on said packaging material so that the ink used to produce the bar code is such that indicia constituting the bar code can be discriminated from the packaging material regardless of the albedo of the packaging material onto which the bar code is printed.

2. A method according to claim 1, wherein the ink used to generate bar code indicia possesses chromaticity in a region selected from (i) the extremes of the visible spectrum, (ii) the near infra-red spectrum, and (iii) the near ultra-violet spectrum and is generally transparent in the visible part of the spectrum.

3. A method according to claim 1, wherein a handheld bar code application unit is capable of printing bar code indicia using one of a plurality of inks having differing albedos.

4. A method of applying a bar code to a product enclosed in a packaging material, including the steps of selecting an ink having chromaticity in the infra-red or ultra-violet regions of the spectrum but substantially no chromaticity in the visible region of the spectrum; and imprinting bar code indicia with said selected ink onto said packaging material so that said bar code indicia can be discriminated from the packaging material regardless of the chromaticity of the packaging material in the visible range.

5. The method of claim 1 for applying a bar code to a product, further comprising the steps of selecting from said set of inks a second ink having an albedo differing from the albedo of said first selected ink more than the contrast between the albedos of the first selected ink and the package, and applying said second selected ink between bar code indicia formed by said first ink, wherein a machine-readable bar code is provided in instances where there is an insufficient contrast between the albedo of the packaging material and the albedos of said set of inks.

6. A hand-held apparatus for imprinting a bar code onto a package, comprising:
   hand-held means for measuring a mean albedo of a package to be imprinted;
   a plurality of ink stores, each having a different albedo, operatively coupled to said hand-held means;
   means, disposed within said hand-held means, for selecting from said ink stores a first ink having an albedo with at least a first pre-determined contrast to the sensed mean albedo of the packaging to be imprinted; and
   means for imprinting identifying bar code indicia onto said package with said first selected ink, wherein the hand-held apparatus is capable of imprinting a machine-readable car code onto a variety of packages having differing mean albedos by selecting a highest contrast ink from the ink stores in the hand-held apparatus.

7. The hand-held bar code imprinting apparatus of claim 6 further comprising:

means for selecting from said stores a second ink having at least a second pre-determined contrast to the albedo of said first selected ink, and for imprinting said second ink on said package in regions on the package, between the bar code indicia of the imprinted pattern of said first selected ink, wherein machine-readable bar codes are imprinted on packages having an albedo with insufficient contrast to an albedo of any one of said ink stores.

8. The hand-held bar code printing apparatus of claim 6, wherein one of said ink stores is absorptive in the infra-red spectrum and generally transparent in the visible spectrum.

9. A method of applying a bar code to a package, comprising the steps of:
using a hand-held car code print device storing a plurality of inks having differing albedos;
measuring a mean albedo of a package to be imprinted;
selecting from among said plurality of inks a first ink having an albedo with at least a first predetermined contrast to the mean albedo of the package to be imprinted; and
imprinting bar code indicia onto said package with said first selected ink, wherein a variety of packages having differing albedos may be imprinted with a bar code by use of a single hand-held device.

10. The method of claim 9 further comprising the steps of:
selecting from among said plurality of inks a second ink having an albedo with at least a second predetermined contrast from the albedo of said first selected ink;
imprinting bar code indicia onto said package with said first ink; and
imprinting the second ink onto regions of the package between the bar code indicia imprinted with said first ink, wherein said machine-readable bar code indicia are imprinted onto a package having an albedo of less than a desired contrast to the albedos of any of said plurality of inks.

11. The method of claim 5 wherein said second ink is applied simultaneously with an imprinting of identifying bar code indicia with said first selected ink.

12. The apparatus of claim 7 wherein said second ink selecting means further includes means for simultaneously imprinting said second ink on said package simultaneously with the imprinting of said fist selected ink.

13. The method of claim 10 wherein said second ink is imprinted simultaneously with the imprinting of said first ink.

14. The method of claim 1 further comprising the steps of reading the identifying bar code indicia imprinted with said first ink and, if said bar code reading differs from the bar code that was to be imprinted, covering with said first ink said imprinted bar code indicia, selecting a second ink from said set of inks, and imprinting identifying bar code indicia with said second ink over the area covered with said first ink.

15. The method of claim 14 further comprising the steps of re-reading the identifying bar code indicia imprinted with said second ink and, if said re-read bar code differs from the bar code that was to be imprinted with said second ink, re-covering with said second ink said imprinted bar code indicia, selecting a different ink from said set of inks, and re-imprinting identifying bar code indicia with said different ink over the area re-covered with said second ink.

16. The method of claim 16 further comprising the steps of reading the identifying bar code indicia imprinted with said first ink and, if said bar code reading differs from the bar code that was to be imprinted, covering with said first ink said imprinted bar code indicia, selecting a second ink from said set of inks, and imprinting identifying bar code indicia with said second ink over the area covered with said first ink.

17. The method of claim 16 further comprising the steps of re-reading the identifying bar code indicia imprinted with said second ink and, if said re-read bar code differs from the bar code that was to be imprinted with said second ink, re-covering with said second ink said imprinted bar code indicia, selecting a different ink from said set of inks, and re-imprinting identifying bar code indicia with said different ink over the area re-covered with said second ink.

18. The imprinting apparatus of claim 6 further comprising a means for reading said identifying bar code indicia.

19. The imprinting apparatus of claim 18 wherein said bar code reading means includes a light source and a detector.

20. The imprinting apparatus of claim 19 wherein said light source includes a broad spectrum light source and a plurality of selectable filters.

21. The imprinting apparatus of claim 19 wherein said light source includes at least a first light source providing illumination in a first portion of the electromagnetic spectrum and a second light source providing illumination in a second portion of the electromagnetic spectrum relatively distant from said first portion.

22. The imprinting apparatus of claim 18 further comprising means for detecting if imprinted bar code indicia conform to an intended bar code and, if not, for causing said ink imprinting means to cover with said first ink the imprinted bar code indicia, causing said selecting means to select a second ink, and causing said imprinting means to imprint identifying bar code indicia with said second ink onto an area covered with said first ink.

* * * * *